United States Patent
Ishizawa et al.

(10) Patent No.: US 6,478,999 B1
(45) Date of Patent: Nov. 12, 2002

(54) PROCESS OF MAKING ADHESIVE TAPE

(75) Inventors: Seiya Ishizawa, No. 114-4, Terado, Shizuoka-shi, Shizouka-ken 421-0137 (JP); Tomoaki Ishizawa, No. 13-17, Tennou-cho 2-chome, Fujieda-shi, Shizouka-ken 426-0019 (JP); Kinichi Yazawa, Fujieda (JP); Tetsuo Nagai, Shida-gun (JP)

(73) Assignees: Seiya Ishizawa, Shizouka (JP); Tomoaki Ishizawa, Shizouka (JP)

( * ) Notice: Subject to any disclaimer, the term of this patent is extended or adjusted under 35 U.S.C. 154(b) by 100 days.

(21) Appl. No.: 09/594,698

(22) Filed: Jun. 16, 2000

(30) Foreign Application Priority Data

Jun. 22, 1999 (JP) .......................................... 11-174805

(51) Int. Cl.⁷ ......................... B29C 39/20; B29C 47/06; B29C 55/06; B29C 55/10; B29C 71/02
(52) U.S. Cl. ...................... 264/130; 264/134; 264/146; 264/173.11; 264/173.15; 264/210.3; 264/210.7; 264/235.6; 264/235.8; 264/236; 264/288.4; 264/290.2

(58) Field of Search ................................. 264/130, 134, 264/146, 160, 210.3, 235.6, 235.8, 236, 288.4, 290.2, 173.11, 173.15, 210.7

(56) References Cited

U.S. PATENT DOCUMENTS 4,451,533 A * 5/1984 Wong et al. ......... 264/288.4 X

\* cited by examiner

Primary Examiner—Leo B. Tentoni
(74) Attorney, Agent, or Firm—Oliff & Berridge, PLC

(57) ABSTRACT

A manufacturing method of adhesive tape, by preparing a raw material of a biaxially or non-drawn, film or sheet on the back surface of which a release agent has been applied and to the which an adhesive agent has been applied, and subjecting the raw material to uniaxial drawing under heated conditions without deteriorating releasing and adhesive performance of the raw material, thus producing an adhesive tape having high-strength and low-elongation. The obtained adhesive tape has long and narrow bubbles elongated in the uniaxial drawing direction thereon.

4 Claims, 3 Drawing Sheets

PROCESS OF MAKING ADHESIVE TAPE

BACKGROUND OF THE INVENTION

1. Field of the Invention

The present invention relates to a manufacturing method of an adhesive tape, for example, being stuck on inner side walls of a box made of corrugated cardboard to serve as an opener or a reinforcing member of the box, and the adhesive tape manufactured by the said method. More particularly, the present invention relates to a manufacturing method of an adhesive tape having high-strength and low-elongation, and the adhesive tape manufactured by the said method.

2. Description of the Related Art

A structure of a box, for example a corrugated carton 101, is as illustrated in FIG. 2. The corrugated carton 101 has side walls 103. An adhesive tape 105 serving as an opener of the box 101 is stuck on the upper part and the inside of the side walls 103. This kind of adhesive tape 105 serving as the box opener is normally stuck on this place, that Is the upper part and the inside of the corrugated carton 101, and there are further provided cuts A along the adhesive tape 105 being stuck on the corrugated carton 101. When the corrugated carton 101 is to be opened, a person will pick up any part of the cuts A on the side wall 103, and then he will pull this part in the peripheral direction. Consequently, the part of the corrugated carton 101 will be peeled along the cuts A as well as along the adhesive tape 105 being stuck on the inner side walls of the corrugated carton 101, thus the upper part of the corrugated carton 101 is opened.

The adhesive tape 105 also serves as a reinforcing member of the corrugated carton 101.

A manufacturing method of the above discussed adhesive tape according to a prior art will be summarized as follows.

First, a film or a sheet is produced by casting or forming, and then a uniaxial or biaxial drawing is performed thereon. After that, heat treatment is performed on the film or sheet for the purpose of surface activation, and then the film or sheet is wound as to be a roll. A release agent is applied on the back surface of the film or sheet, and then the film or sheet is heated. An adhesive agent is applied on the film or sheet, and then the film or sheet is heated. Finally, the film or sheet is alit. As a result, an adhesive tape having a desired width is obtained.

The uniaxial drawing as above described means the stretching and orientating of a plastic film in one (longitudinal or lateral) direction at a temperature between the melting point and the second order transition point of the plastic film. The biaxial drawing as above described means the stretching and orientation of a plastic film in two (longitudinal and lateral) directions at a temperature between the melting point and the second order transition point of the plastic film.

However, the prior art manufacturing method of an adhesive tape as above discussed has the following disadvantageous points.

First, in the thus obtained adhesive tape as the final product, there exists longitudinal crack or fuzz. This problem is caused due to occurrence of fiberization of the film or sheet. In addition, the manufacturing of the prior art adhesive tape as above discussed requires a large-sized production facility, which would result in higher production cost.

Further, slitting or cutting of the fiberized film or sheet (in order to obtain an adhesive tape of a desired width) provides more remarkably longitudinal crack or fuzz because the fiberized film or sheet is slit in the perpendicular direction with respect to the fiberized direction, whereby the fiber is cut.

Second, there still remains some residual volatile component of the adhesive agent after the applied adhesive agent has been heat-dried. When the adhesive tape is used, this residual component is volatized while giving off a foul smell. This problem is caused due to insufficient heating and drying of the film or sheet after application of the adhesive agent.

SUMMARY OF THE INVENTION

In the light of problems which have been described as above, the object of the present invention is to provide a manufacturing method of an adhesive tape which is free from longitudinal crack or fuzz, with no residual volatile component (derived from an adhesive agent) in a small-sized facility.

For the object as above discussed, according to a first embodiment of the present invention, there is provided a manufacturing method of adhesive tape, comprising steps of: preparing a raw material of a biaxially or non- drawn, film or sheet on the back surface of which a release agent has been applied and to the which an adhesive agent has been applied, and subjecting the raw material to uniaxial drawing under heated conditions without deteriorating releasing and adhesive performance of the raw material, thus producing a base material of an adhesive tape having high-strength and low-elongation.

According to a second embodiment of the invention, there is provided the manufacturing method of an adhesive tape as described above, further comprising a post-heat treatment step of heating the drawn material, the uniaxial drawing step and the post-heat treatment step involving heating the release agent and the adhesive agent sufficiently to complete their cure reactions as well as to remove a volatile component of the adhesive agent, which otherwise would volatile and give off a foul smell in use.

According to a third embodiment of the invention, there is provided the manufacturing method of an adhesive tape according to the first embodiment of the invention, in which the uniaxial drawing step is performed under drawing conditions where width, thickness, draw ratio, temperature, speed and period of time are so set suitably in given ranges that a resultant adhesive tape will possess desired width, thickness, strength and elongation.

According to a fourth embodiment of the invention, there is provided the manufacturing method of adhesive tape according to the first embodiment of the invention, further comprising a step of slitting of the raw material at a predetermined width before the uniaxial drawing step.

According to a fifth embodiment of the invention, there is provided an adhesive tape manufactured by steps of: preparing a raw material of a biaxially or non- drawn, film or sheet on the back surface of which a release agent has been applied and to the which an adhesive agent has been applied, and subjecting the raw material to uniaxial drawing under heated conditions without deteriorating releasing and adhesive performance of the raw material, thus producing a base material of an adhesive tape having high-strength and low-elongation.

According to a sixth embodiment of the invention, there is provided the adhesive tape as described above, wherein long and narrow bubbles elongated in the direction of the uniaxial drawing are seen on the adhesive tape.

The inventive manufacturing method is characterized by preparing a raw material of a biaxially drawn film or sheet on the back surface of which a release agent has been applied and to the which an adhesive agent has been applied, and subjecting the raw material to uniaxial drawing under heated conditions without deteriorating releasing and adhesive performance of the raw material. Consequently, the method inhibits the fiberization and requires no facility required for steps ranging from casting, forming to applying adhesive agent.

If the post-heat treatment is subjected to the drawn material, heating during the uniaxial drawing step and the post-heat treatment step can complete the curing reaction of the release agent and the adhesive agent. In addition to the completion of the reaction of the release agent and the adhesive agent, some volatile component of the adhesive agent can be removed, which would otherwise volatize and give off a foul smell in use.

The uniaxial drawing conditions, that is, width, thickness, drawrate, temperature, speed and period of time can be so set suitably in given ranges that a resultant adhesive tape will possess desired width, thickness, strength and elongation.

Further, slitting the raw material in the width direction may be done, prior to the uniaxial drawing step.

During application of the adhesive agent, an extremly small amount of bubbles are inevitably mixed in the applied coat due to volatilization of the adhesive agent, etc. In the prior art method in which an adhesive agent is applied after uniaxial drawing has been performed, each of these bubbles has spherical shape (that is, the shape of bubble as it is), which is substantially the same as illustrated in FIG. 3. However, according to the present invention in which uniaxial drawing is performed after an adhesive agent has been applied, each of the bubbles is extended in the direction of the uniaxial drawing, or long and narrow, as illustrated in FIG. 4 (in the present case, the drawing is performed at a draw rate of about 2.7 times). That is to say, uniaxial drawing changes the bubbles from the FIG. 3 shape to the FIG. 4 shape.

Therefore, the adhesive tape manufactured according to the present invention can graphically be characterized in that the long and narrow bubbles elongated in the direction of the uniaxial drawing are seen on the adhesive tape.

BRIEF DESCRIPTION OF THE DRAWINGS

The invention will be described below in detail with reference to the accompanying drawings, in which.

DETAILED DESCRIPTION OF THE INVENTION

Figure 1:
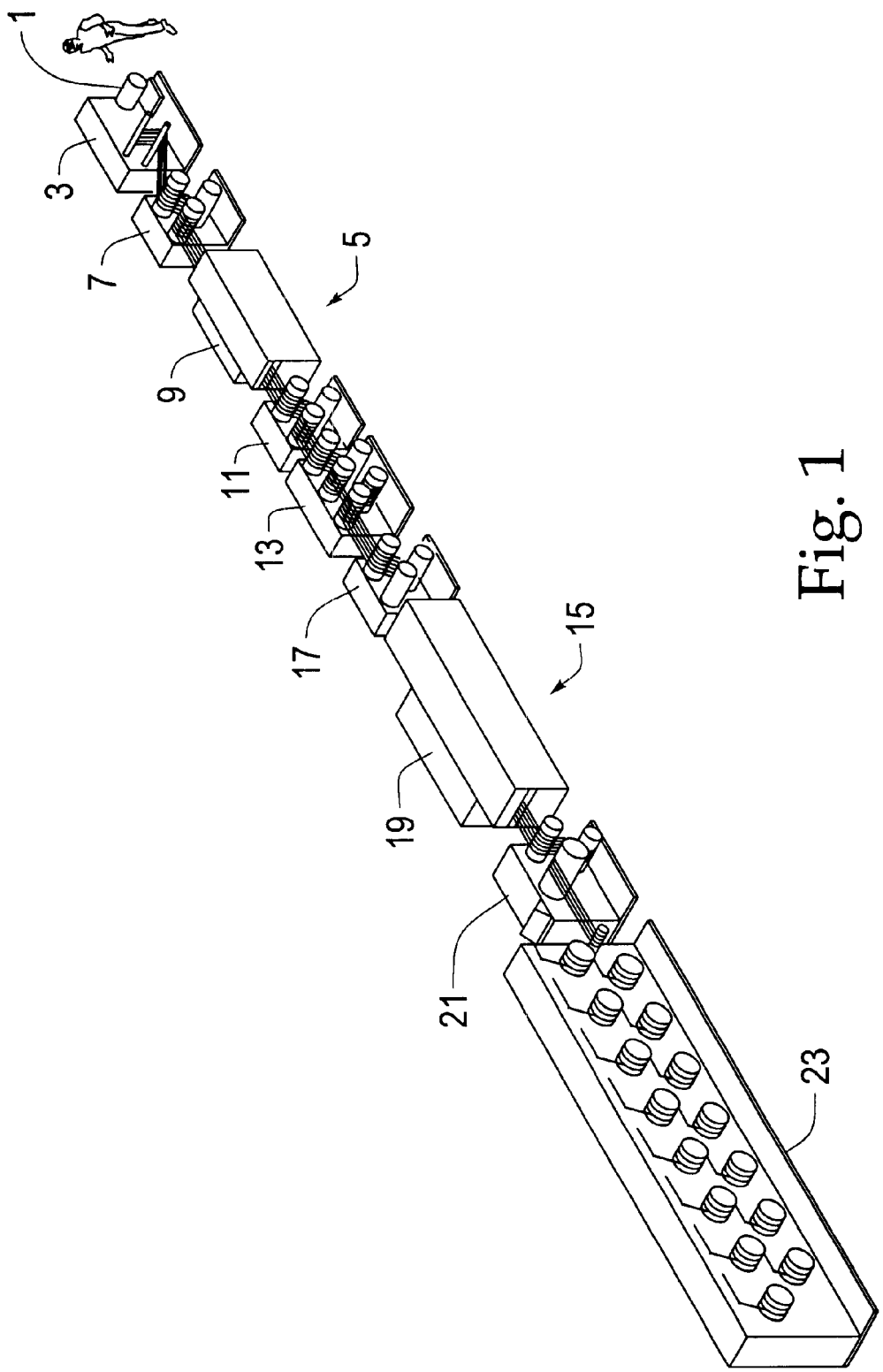
FIG. 1 is a perspective view of a manufacturing apparatus which carries out a manufacturing method of an adhesive tape according to an embodiment of the present invention.
Figure 2:
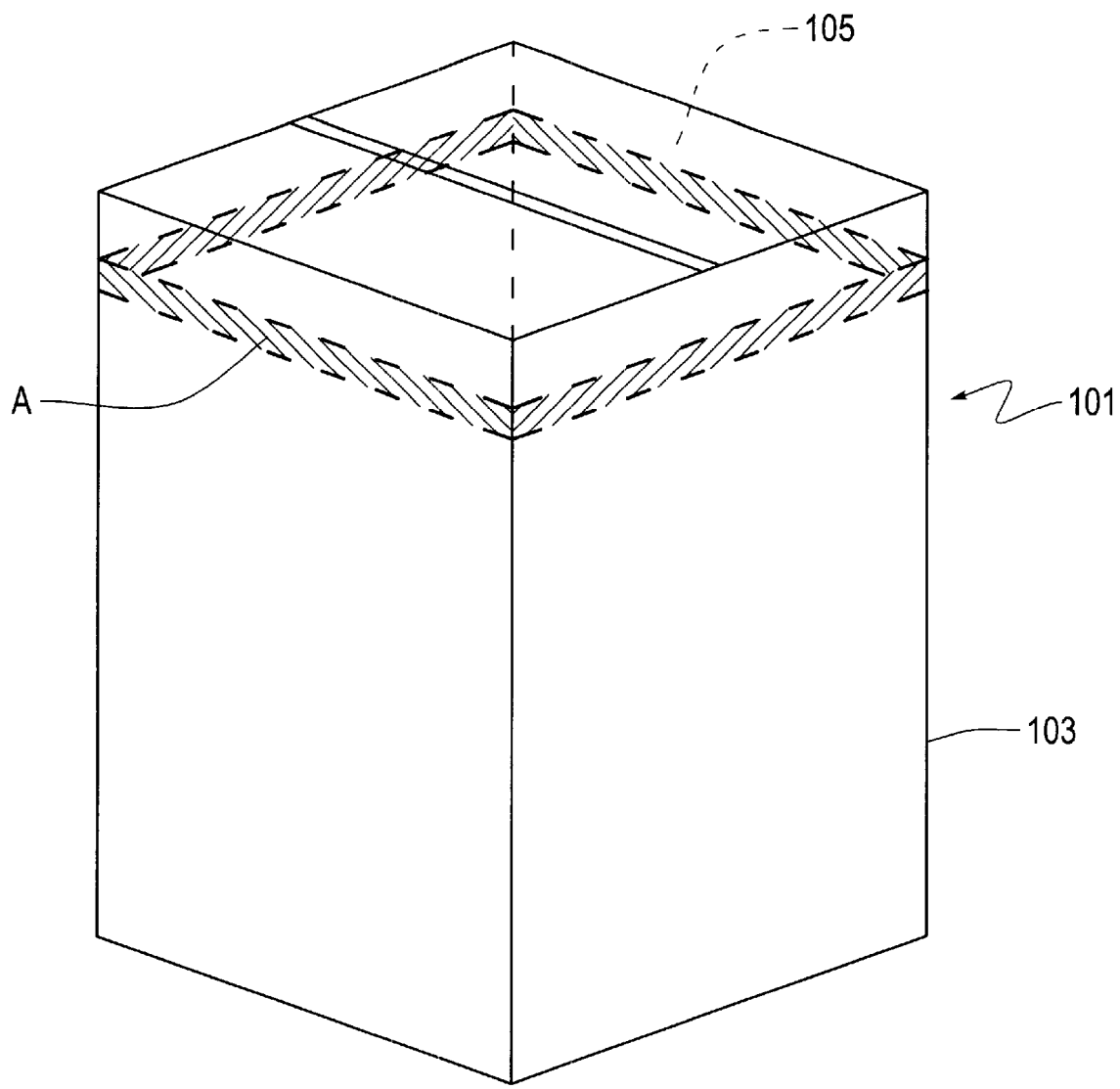
FIG. 2 is a perspective view of a box made of corrugated cardboard on which inner side wall an adhesive tape is stuck.
Figure 3:
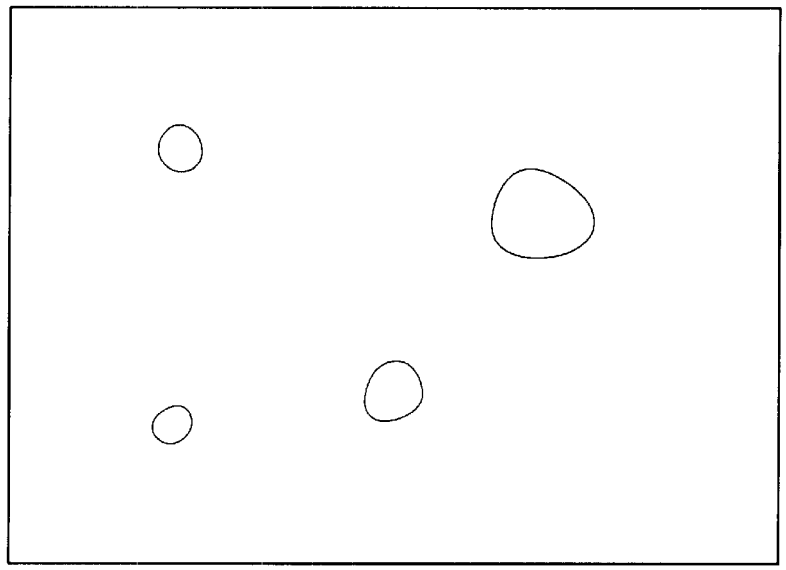
FIG. 3 is a magnified view (magnification: 200) of an adhesive tape in which uniaxial drawing has not yet been performed.
Figure 4:
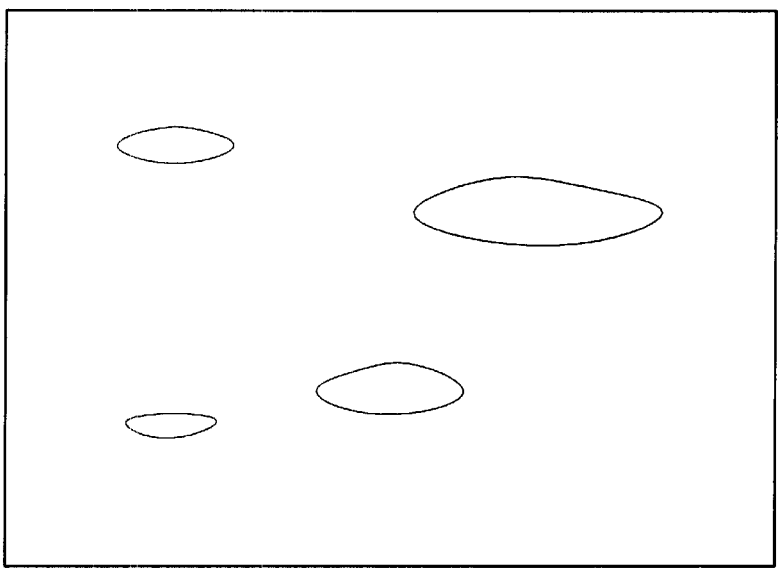
FIG. 4 is a magnified (magnification: 200) of an adhesive tape in which uniaxial drawing has been performed on the FIG. 3 adhesive tape according to the present Invention.

An embodiment of the present invention will now be described in detail with reference to FIG. 1. FIG. 1 is a perspective view showing a structure of a manufacturing apparatus which carries out a manufacturing method of an adhesive tape according to an embodiment of the present invention.

There is a raw material 1 at the right end of FIG. 1. The raw material 1 is wound and take a roll of a biaxially or non-drawn film or sheet on the back surface a release agent has already been applied and to which an adhesive agent has already been applied.

This type of raw material 1 is available on ordinary commercial market.

The raw material 1 is first transferred into a slitter 3 and slit at a predetermined width. The slit material is then introduced into a drawing apparatus 5. The drawing apparatus 5 comprises a drawing roll 7, a heating bath 9, another drawing roll 11 and a tension roll 13. After the slit material is introduced into the drawing apparatus 5, the slit material is subjected to uniaxial drawing involving heating.

If uniaxial drawing conditions, that is, width, thickness, draw rate, temperature, speed and period of time are set suitably, there will be manufactured an adhesive tape having desired material characteristics in regard to the width, thickness, strength and elongation.

The drawn material is then introduced into a heat treatment apparatus 15. The heat treatment apparatus 15 comprises a heat treatment roll 17, a heating bath 19, and another thermal treatment roll 21. The heat treatment apparatus 15 carries out a post-heat treatment under given conditions. The heat-treated material is then introduced into a winder 23, from which an adhesive tape as the final product comes out.

For example, when the uniaxial drawing was performed under the conditions (width: 18 mm; thickness: 65 $\mu$m; draw rate: 3 times; temperature: 160° C.). and then the post-heat treatment was performed at a temperature between 190 and 191° C., there was obtained an adhesive tape having a width of 4 mm and a thickness of 60 $\mu$m.

The present invention has the following effects.

First, the adhesive tape having high-strength and low-elongation can be obtained upon uniaxial drawing.

In this connection, adhesive tapes having "high-strength and low-elongation" are defined by ones having the characteristics (tensile strength: 30–60 kgf/mm$^2$: breaking elongation: 15–35%; adhesive strength: 600–900 g/10 mm$^2$; and heat shrinkage: not more than 5%/120° C. 15 minutes in hot air).

Second, there is no residual volatile component of the adhesive agent in the adhesive tape. Consequently, when the adhesive tape is actually used, there is no emission of a foul smell. This is because the curing reaction of the adhesive agent has been completed upon heating during the uniaxial drawing and the post-heat treatment.

Third, the facility required for steps ranging from casting to adhesive agent applying is no longer required, which has been required in the prior art method. Thus the manufacturing facility can be simplified, thereby the cost for the manufacturing facility can be reduced.

Fourth, according to the present invention, since the raw material 1 is cut at a predetermined width by the slitter 3 before the uniaxial drawing step, the occurrence of the longitudinal crack and fuzz around the cut portion is more effectively prohibited.

Although the embodiment performs the slitting prior to the uniaxial drawing, the scope covered by the present invention is not limited to the disclosure of the embodiment and may the case where the splitting is performed after the uniaxial drawing.

Fifth, according to the present invention, since uniaxial drawing is carried out after the raw material 1 is cut at a predetermined width by the slitter 3, the unevenness of thickness of the drawn material in the width direction can remarkably be reduced. Consequently, it is possible to reduce scraps produced by cutting both ends (in the width direction) of the drawn material in order to obtain the flat surface thereof, which may contribute to the increase of yield.

Sixth, the raw material can be obtained easily. Further, it is possible to obtain various raw material which are suitable for manufacturing of small-quantity and at the same time various types of products.

As above discussed, according to the present invention, it is possible to inhibit the disadvantage due to the fiberization, thus obtaining the adhesive tape having high-strength and low-enlogation.

The thus obtained adhesive tape has no residual volatile component of the adhesive agent. Consequently, when the adhesive tape is actually used, there is no emission of a foul smell.

The facility required for steps ranging from casting to adhesive agent applying is no longer required. Thus the manufacturing facility can be simplified, thereby the cost for the manufacturing facility can be reduced.

Further, in regard to the adhesive tape according to the present invention, there occurs no longitudinal crack or the fuzz at the cut end.

The raw material can be obtained easily, and is suitable for manufacturing of small-quantity and at the same time various types of products.

What is claimed is:

1. A manufacturing method of adhesive tape, comprising steps of:

preparing a raw material of a biaxially drawn film or sheet;

applying a release agent on a back surface of the film;

applying an adhesive agent on a front surface of the film; and subjecting the raw material to uniaxial drawing under heated conditions without deteriorating releasing and adhesive performance of the raw material to produce a base material of an adhesive tape having high-strength and low-elongation.

2. The manufacturing method of an adhesive tape as claimed in claim 1, further comprising a post-heat treatment step of heating the drawn material, the uniaxial drawing step and the post-heat treatment step involving heating the release agent and the adhesive agent sufficiently to complete their cure reactions as well as to remove a volatile component of the adhesive agent, which otherwise would evaporate and give off a foul smell in use.

3. The manufacturing method of an adhesive tape as claimed in claim 1, in which the uniaxial drawing step is performed under drawing conditions where width, thickness, draw ratio, temperature, speed and period of time are so set suitably in given ranges that a resultant adhesive tape will possess desired width, thickness, strength and elongation.

4. The manufacturing method of adhesive tape as claimed in claim 1, further comprising a step of slitting of the raw material at a predetermined width before the uniaxial drawing step.

* * * * *